May 5, 1970                B. I. TREHN              3,510,659
SET OF DIFFERENTLY CODED COUNTERPIECES AND APPARATUS
FOR SENSING THE SAME
Filed Dec. 8, 1966                              2 Sheets-Sheet 1

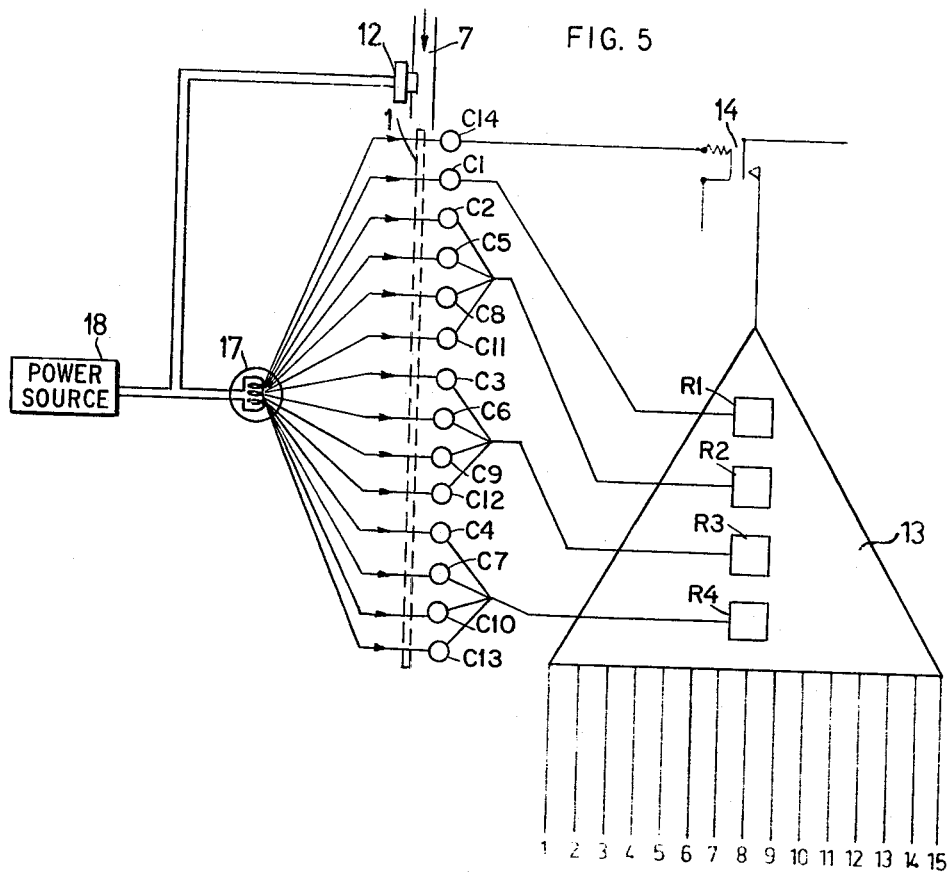
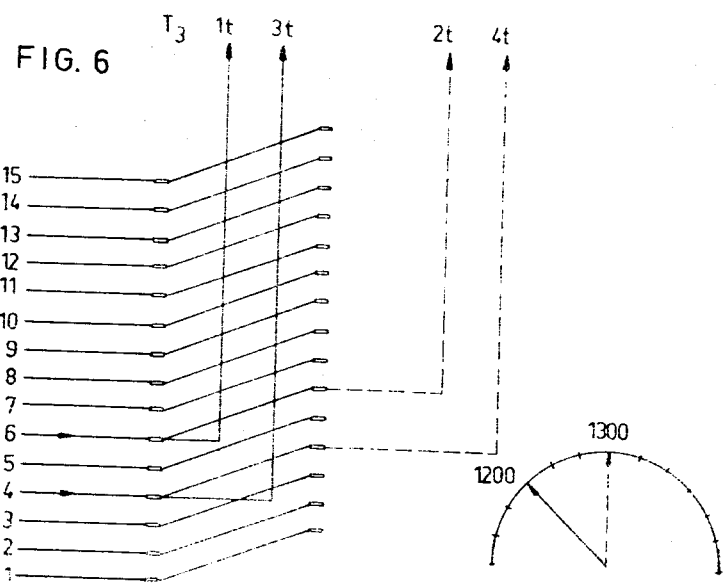

United States Patent Office 3,510,659
Patented May 5, 1970

3,510,659
SET OF DIFFERENTLY CODED COUNTERPIECES
AND APPARATUS FOR SENSING THE SAME
Bengt Ison Trehn, Stockholm, Sweden, assignor to
Metior AB, Stockholm, Sweden
Filed Dec. 8, 1966, Ser. No. 600,248
Claims priority, application Sweden, Dec. 10, 1965,
16,028/65
Int. Cl. H01j *39/12, 3/14;* G06k *9/08*
U.S. Cl. 250—209                                    7 Claims

ABSTRACT OF THE DISCLOSURE

A set of differently coded counterpieces in the form of circular discs which have apertures through the same along concentric circumferential paths which lie at different distances from the center of the disc. The apertures along the different circumferential paths constitute different elements in the final code for each disc and the code carried by each disc is sensed by an apparatus which includes photocells coordinated positionwise to all of the various apertures with which a particular disc may be coded.

---

This invention relates to a set of counters comprising a series of different counterpieces. The main characteristic feature of the invention is that the different counterpieces in the set are circular discs having the same diameter and coded with one or more markings spaced different distances from the centres of the discs, the number of different distances from said centres to the markings and the sizes of said distances being determinative of the consecutive order of the counters in the series.

The invention also relates to a sensing apparatus for sensing the different counters in the set of counters. This apparatus is primarily characterised in that in a position for receiving the counter the apparatus has sensing means disposed on concentric circles and serving to sense the markings of the counter, the radii of the circles being equal to the distances of the markings from the centre of the counter, and the sensing means are arranged so close together on said circles that all markings are sensed irrespective of the angular position occupied by the counter in the receiving position of the sensing apparatus.

The invention thus provides a counter disc which, having a small number of possible markings, can be one of a large series of counters and which can be univocally sensed by simple means. A counter disc having a code consisting of four possible markings can thus be one of a series of fifteen counters, as the counter can be provided with fifteen different combinations of markings. The sensing procedure and also a continued handling of the counters in machines can be readily accomplished since the counter discs are to have the same external diameters.

The above features of the invention and the advantages gained thereby will appear from the following description in which reference is made to the accompanying drawings illustrating two embodiments of a counter as well as a sensing apparatus for the counters, preferably for time indication purposes.

Figure 4:
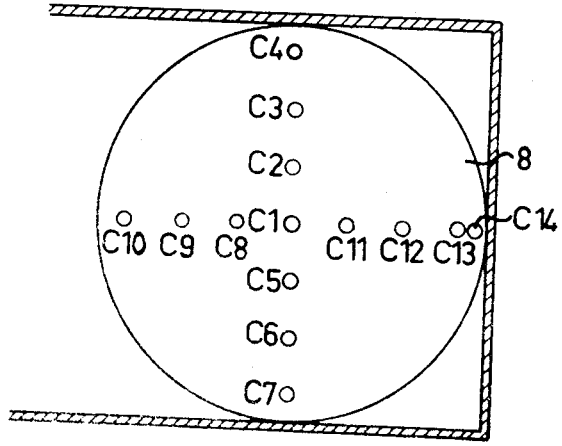

FIG. 4 on a larger scale shows that part of said apparatus which is equipped with the sensing means;

FIG. 5 is a schematic diagram illustrating the arrangement controlled by insertion of a counter disc for illuminating the various sensing elements in the sensing apparatus and which also shows how the sensing elements are connected to a relay group with outgoing leads;

FIG. 6 shows said outgoing leads combined with a timer for establishing time intervals.

Figure 1:
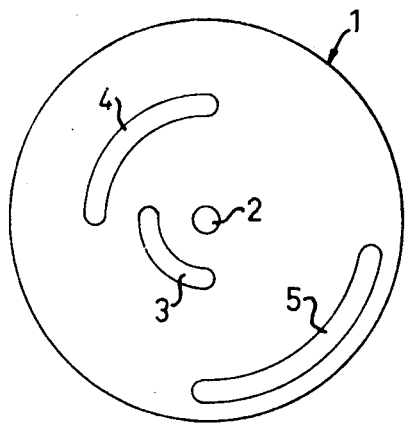
FIG. 1 shows a counter in one embodiment thereof.

The counter 1 shown in FIG. 1 is a circular piece or disc and has a code consisting of four markings 2–5 in the form of through holes. The marking 2 is located at the centre of the piece or disc 1 while the markings 3–5 are slots situated at various distances from the centre of the disc 1. Counted from the centre of the disc 1, the slot 3 may be at a distance of 7 mm., the slot 4 at a distance of 14 mm. and the slot 5 at a distance of 21 mm. Other distances may also be chosen, and of course the slots need not either be spaced equal distances apart.

The extension of the markings 3–5 is dependent upon the denseness of the sensing means arranged in the sensing apparatus. The denser means, the lesser need be the extension of the markings 3–5. In FIG. 1 the slots 3–5 are curved and have their centres of curvatures located at the centre of the disc 1, the radii of curvature being equal to the distances of the slots 3–5 from the centre of the disc 1. Each slot 3–5 has a length of approximately a quarter of a turn so that a sensing means can always engage the slot, provided each slot corresponds to at least four uniformly distributed sensing means.

Figure 2:
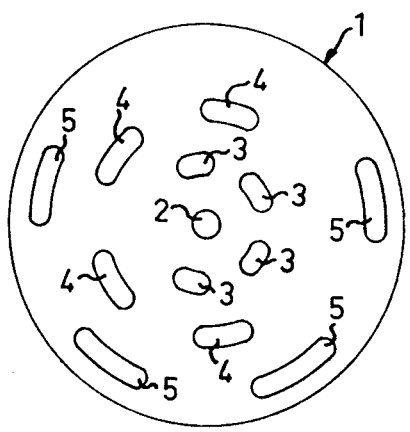
FIG. 2 shows the counter in the other embodiment thereof.

The counter shown in FIG. 2 in principle is identical with the counter in FIG. 1, the only difference being that each slot 3–5 has been divided into four parts, the total effective extension of which is approximately a quarter of a turn. When sensed, the counter in FIG. 2 therefore will give the same result as the counter in FIG. 1. As a consequence, the order of the counter in the series is determined not by the number and position of the holes, but by the number of different distances from the centre of the counter to the slots and by the sizes of said distances.

On the basis of the foregoing it is readily understood that the slots 3–5 can be relatively displaced on their circles without the sensing procedure being affected. Such displacements can thus be resorted to in order to avoid forgeries.

Figure 3:
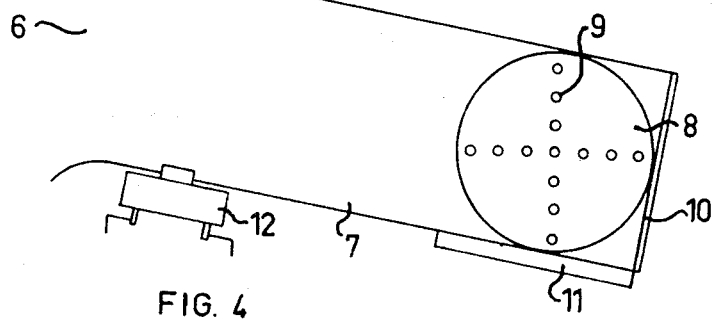
FIG. 3 shows the sensing apparatus.

The sensing apparatus shown in FIG. 3 comprises a slot 6 for the insertion of counters, which via an inclined path 7 down which the counters roll, leads to the position for receiving the counters, said position 8 being provided with means 9 for sensing the markings of the counters. Furthermore, the sensing apparatus comprises a stop 10 and a counter discharge 11 which can be opened and closed by means of a slide. A micro-switch 12 is adapted to light a lamp 17 by closing a circuit between the lamp and a source of electric power 18 when the sensing means 9 are photocells or like devices. The lamp when lighted is intended to actuate the sensing means 9.

The sensing means 9 are arranged on concentric circles the radii of which are equal to the distances of the markings 2–5 from the centre of the counter 1. The sensing means 9 are arranged so close together on the circles that all markings 2–5 can be sensed irrespective of the angular position occupied by the counter 1 in the receiving position 8 of the sensing apparatus. With circular sensing means 9 the markings need have a very small lateral extension. On the other hand, if the markings are circular a single sensing means 9 of limited extension is sufficient in each circle. The markings of the counter 1 can be circular if constituted e.g. by transparent portions in an otherwise opaque disc of e.g. synthetic plastics.

In the embodiment shown the counter 1 is made from some suitable metal or other material and has through holes 2–5, while sensing means 9 are uniformly distributed on their circles and spaced apart a distance at most equally large as the effective extension of the corresponding markings of the counter. Normally, the number of sensing means 9 in each circle is equally large, but said number of course may very well be varied, in which case the effective extension of the markings may naturally be varied accordingly. It should be observed that it is sufficient to provide one sensing means 9 at the centre.

As will appear from the drawing the sensing means 9 are arranged along two lines passing through the centre of the receiving position 8 and being perpedicular to one another, which presupposes that the total effective extension of the markings 3–5 is at least a quarter of a turn.

In FIGS. 4 and 5 the sensing means, i.e. the photocells or like devices, which are mounted along the two perpendicular lines have been designated C1–C13. All sensing means on each circle are interconnected to form a unit. As appears from the circuit diagram of FIG. 5 that photocell C1 which is disposed at the centre is connected to a relay R1 in a relay group 13. The photocells C2, C5, C8 and C11 in the inner circle are connected to another relay R2 in the relay group 13. In the same way, the photocells C3, C6, C9, C12 and C4, C7, C10, C13, respectively, in the two outer circles are connected to relays R3 and R4 in the relay group 13. The relay group 13 is built up on the basis of binary numbers, for which reason said relay group can deliver, in the present instance, fifteen different output signals depending upon the markings of the counter 1.

In addition to the photocells C1–C13 the sensing apparatus has a photocell C14 so placed that it cannot possibly be lighted when a counter is in the receiving position 8. This photocell C14 is connected to a relay 14 which is adapted to close the circuit to the relay group 13 when a counter 1 covers the photocell C14.

When all photocells C1–C14 are lighted by the lamp 17 or other suitable illuminating means, e.g. immediately after the microswitch 12 in the counter slot 6 has been actuated by an inserted counter 1, the supply of current to the relay group 13 is stopped due to the photocell C14 when lighted actuating the relay 14 in such a way that the current cannot reach the relay group 13. When the counter 1 has arrived in the receiving position 8 the current supply to the relay group 13 is broken due to the photocell C14 remaining unlighted, the supply of current to the relay group 13 being reestablished. This will provide an output signal corresponding to the markings of the counter 1.

When a counter having a given marking implies the time $T_1$ when the counter was obtained, the time interval $T_3$ until the counter is inserted in the sensing apparatus can be determined by a comparison of $T_1$ and the time $T_2$ for the insertion, that is $T_3 = T_2 - T_1$.

$T_3$ can be determined, e.g. by the provision of a rotary selector which is set by means of a timer for different positions according as time elapses. When a signal is received the selector determines the signal to be transmitted. The latter signal is the difference between $T_2$ and $T_1$, that is $T_3$. In FIG. 6 the selector is in the position for 1200 hours. The signal 4 obtained from a certain counter shows the time $T_1$, that is 900 hours in the example. The output signal shows $T_3$, that is three hours. Another counter has given the signal 6, that is 1100 hours, for which reason the output signals shows $T_3$ equal to one hour.

In the second position of the selector (shown by dash lines) corresponding to 1300 hours, the corresponding counters give the time interval $T_3$ equal to four and two hours, respectively, as is readily realized. These signals can be supplied to a counting apparatus which for example shows how much the owner of the counters has to pay for the time interval in question. Therefore, the counter according to the present invention can be used to advantage in an all-automatic control and pay installation in parking houses the different counters in the series corresponding to the counters of varying size that are employed in said installation. The counter according to the present invention, however, has many other uses also. For example, distance can be substituted for time, in which case the counters and the sensing apparatus will determine a certain length by which the owner of the counters has moved and for which length of movement he has to pay.

It will be understood by those skilled in the art that the invention is not restricted to that which has been described above and shown in the drawings but incorporates variations and modifications within the scope of the appended claims. Thus the counter according to the invention may be one of a series of counters of varying diameter so as to form series in said series.

I claim:

1. In an apparatus for sensing different counters in a counter set which are constituted by differently coded circular counter discs of the same diameter, and wherein each counter disc is provided with one or more through apertures centered at different distances from the disc centre, the combination comprising a plurality of means located at a receiving position for respectively sensing said through apertures, and means for presenting each said apertured counter disc to said receiving position for reading by said plurality of sensing means, said disc being stationary with respect to said plurality of sensing means when at said receiving position, said plurality of sensing means being located respectively on concentric circles the radii of which are equal respectively to the distances of said apertures in said disc from the disc centre, each of said sensing means being constituted by a plurality of circumferentially spaced sensing elements, and the spacing between sensing elements being such that all apertures in said counter disc are sensed simultaneously irrespective of the angular position occupied by said counter disc when reaching said receiving position.

2. Apparatus as defined in claim 1 for sensing differently coded counter discs wherein said sensing elements are uniformly spaced in a circumferential direction along their respective circles and the spacing between adjacent sensing elements is at most equal to the effective extension of the corresponding apertures of said counter discs.

3. Apparatus as defined in claim 1 wherein said sensing elements of all of said sensing means are located along two intersecting lines which pass through a common centre of the sensing means and said lines of sensing elements are perpendicular to each other, and a total effective arcuate extension of said through apertures along each circle in said counter discs is at least equal to a quarter of a circle.

4. Apparatus as defined in claim 3 wherein all of said sensing elements on each circle are functionally connected together to form a unit.

5. Apparatus as defined in claim 1 wherein said sensing elements are constituted by photocells, and further including lamp means for illuminating said photocells through the apertures in said counter discs.

6. Apparatus as defined in claim 5 and further including switch means actuated by said counter discs in moving to said receiving position for energizing said lamp means.

7. Apparatus as defined in claim 5 wherein the photocells physically spaced along each circle are electrically interconnected to form a group connection, and said group connections are in turn connected to a corresponding relay in a relay group operating on the basis of a binary number system.

(References on following page)

References Cited

UNITED STATES PATENTS

| | | | |
|---|---|---|---|
| 3,024,365 | 3/1962 | Smith et al. | 250—233 X |
| 3,217,314 | 11/1965 | Frank | 250—210 X |
| 3,218,626 | 11/1965 | Schuman | 250—210 X |
| 2,541,247 | 2/1951 | Herr | 250—219 |
| 2,605,965 | 8/1952 | Shepard | 250—219 |
| 3,036,765 | 5/1962 | Jones et al. | 250—219 |
| 3,042,806 | 7/1962 | Lubin | 250—219 |
| 3,248,552 | 4/1966 | Bryan | 250—209 X |

ROBERT SEGAL, Primary Examiner

C. R. CAMPBELL, Assistant Examiner

U.S. Cl. X.R.

250—233; 356—71